United States Patent [19]
Kamio

[11] Patent Number: 5,264,327
[45] Date of Patent: Nov. 23, 1993

[54] METHOD FOR PREPARING INFORMATION RECORDING MEDIUM

[75] Inventor: Masaru Kamio, Kawasaki, Japan

[73] Assignee: Canon Kabushiki Kaisha, Japan

[21] Appl. No.: 902,557

[22] Filed: Jun. 22, 1992

Related U.S. Application Data

[63] Continuation of Ser. No. 354,758, May 22, 1989, abandoned.

[30] Foreign Application Priority Data

May 26, 1988 [JP] Japan ................. 63-127171

[51] Int. Cl.$^5$ ............................................. G11B 7/26
[52] U.S. Cl. ................................. 430/321; 430/270; 430/495; 430/945
[58] Field of Search .............. 430/321, 325, 495, 945, 430/270; 346/135.1; 369/275.4, 277, 285

[56] References Cited

U.S. PATENT DOCUMENTS

| | | | |
|---|---|---|---|
| 4,139,853 | 2/1979 | Ghekiere et al. | 346/1 |
| 4,673,626 | 6/1987 | Takeda et al. | 430/14 |
| 4,722,881 | 2/1988 | Ueno et al. | 430/325 |
| 4,722,883 | 2/1988 | Koibuchi et al. | 430/325 |
| 4,877,713 | 10/1989 | Fujita et al. | 430/270 |
| 4,877,717 | 10/1989 | Suzuki et al. | 430/321 |
| 4,954,380 | 9/1990 | Kanome et al. | 428/64 |
| 4,965,153 | 10/1990 | Imataki et al. | 430/11 |
| 5,085,925 | 2/1992 | Hiraoka et al. | 428/215 |

FOREIGN PATENT DOCUMENTS

| | | |
|---|---|---|
| 108258 | 5/1984 | European Pat. Off. . |
| 63-121143 | 5/1988 | Japan ................. 369/275.4 |

OTHER PUBLICATIONS

Patent Abstracts of Japan, vol. 7, No. 224, Oct. 1983, English Language Abstract of JP 58-114340, Andou, Jul. 1983.

Primary Examiner—Charles L. Bowers, Jr.
Assistant Examiner—John A. McPherson
Attorney, Agent, or Firm—Fitzpatrick, Cella, Harper & Scinto

[57] ABSTRACT

A method for preparing an optical recording medium having a preformat comprises forming a recording layer containing a dye and photosensitive resin on a substrate, and then subjecting said recording layer to selective patterning, thereby forming a preformat.

7 Claims, 1 Drawing Sheet

METHOD FOR PREPARING INFORMATION RECORDING MEDIUM

This application is a continuation of application Ser. No. 07/354,758 filed May 22, 1989, now abandoned.

BACKGROUND OF THE INVENTION

1. Field of the Invention

This invention relates to an information recording medium which performs optically recording and reproduction of information.

2. Related Background Art

In recent years, with the progress of information service in society, as a means which can deal with a diversity of informations with good efficiency, there have been proposed a large number of information recording carriers as well as recording and reproducing devices which can perform recording or reproduction of optical information such as optical disc, optical card, optical tape, etc. Among the above information recording carriers, there are those in which information converted to bivalue can be detected through exchange of the change in intensity of reflected light accompanied with change in surface shape such as presence of pit.

As the recording carrier according to the change in optical reflectance, there has been proposed the so called heat mode recording material which records a part of the recording layer through the change in state by irradiating the recording layer with an energy beam such as laser beam in spots. These recording materials are so called DRAW (direct read after write) which can "immediately read after writing" without requiring developing processing, etc. after writing of information, which can perform high density recording and also can perform additional writing.

In an optical recording and reproduction device of information, for track servo of writing and reading, there is the system in which grooves are formed previously at predetermined intervals on the surface of a substrate. According to this system, grooves play the role of guide for reading, and therefore the track control precision of laser beam can be improved, whereby higher speed access is rendered possible than the system of the prior art in which a substrate which has no grooves is employed.

For formation of track grooves on a substrate, when the substrate is a thermoplastic resin, there have been known in the art the method in which a stamper form is heat transferred according such method as injection molding, hot press molding, etc. at a temperature of the melting point or higher, or the method in which a stamper form is optically transferred by coating a photocurable resin composition on the substrate, bringing a stamper mold into close contact therewith and curing said photocurable resin composition by irradaition of UV-ray, etc. thereby to transfer optically the stamper form.

FIG. 3 is a schematic sectional view of an optical card which is one of information recording media of the prior art. In FIG. 3, 6 is a transparent resin substrate, 7 a track portion, 8 a recording layer, 4 an adhesive layer and 5 a card substrate. In FIG. 3, recording and reproduction are performed by way of optical writing and reading through the transparent resin substrate 6 and the track portion 7.

In the card of the prior art, in the case of the heat transfer method as described above, the track portion 7 is integrated with the transparent resin substrate 6 to be of the same material, while in the case of the optical transfer method, the track portion 7 is not of the same material as the transparent resin substrate 6, but in the adhered state. Anyway, track groove corresponding to the guide groove for light is previously formed so as to effect tracking through the phase difference of laser beam by utilizing fine unevenness. Also, the optical card can be manufactured easily by forming an optical recording layer 8 on the track portion 7 and plastering a card substrate 5 through the adhesive layer 4.

As described above, the optical card of the prior art has the constitution such that an optical recording layer is formed on the transparent resin substrate provided with a track portion comprising unevenness shape, and therefore first an unevenness shape must be formed on the transparent resin substrate.

In that case, the yield of transfer of the stamper form, the transfer time, durability and cost of the stamper form, etc. pose problems in making bulk productivity of the optical card difficult, and also increasing the cost.

Further, since the recording sensitivity of the optical recording layer depends on the film thickness, uniform film formation is required. However, it is difficult to obtain uniformity of film thickness, because an optical recording layer is to be formed on the uneven shape of the track portion. Also, there has been also involved the problem that reproducibility of the shape after formation of the optical recording layer is difficult, because the optical recording layer is formed on the uneven shape.

As the method for solving these problems, there has been known the method in which address pits, etc. are directly formed by irradiation of laser beam on the recording layer of Te as described in U.S. Pat. No. 4,428,075. However, according to this method, there has been the problem that the recording layer material scattered is attached on the region for writing information to form noise.

As the method which has solved such problem, there is disclosed in Japanese Patent Laid-open Application No. 59-171046 the method in which there are provided a dye film which is deformed by absorption of visible light on the substrate and a reflective film which records information thereon, and visible laser is irradiated to shrink the dye film, thereby forming a track guide groove. However, according to this method, two layers of the dye film and the reflective film which records information must be formed, and also productivity is poor because the track grooves are formed by scanning laser one by one.

SUMMARY OF THE INVENTION

The present invention has been accomplished in order to solve the above problems. An object of the present invention is to provide an information recording medium with simple constitution and with little noise according to simpler steps than in the prior art by providing a patterned recording layer without previous of a track portion on a transparent substrate.

Another object of the present invention is to provide an information recording medium improved in patterning of the recording layer.

More specifically, the present invention relates to an information recording medium having a recording layer comprising a photosensitive resin containing a dye subjected to patterning.

According to the present invention, a pattern can be formed according to comprehensive irradiation and also track grooves can be formed without use of a stamper, whereby an information recording can be prepared with good efficiency.

According to the present invention there is provided a method for preparing an optical recording medium having a preformat, which comprises forming a recording layer containing a dye and a photosensitive resin on a substrate, and then subjecting said recording layer to selective patterning, thereby forming a preformat.

DESCRIPTION OF THE PREFERRED EMBODIMENT

In the following, the present invention is to be described in detail.

Figure 1:
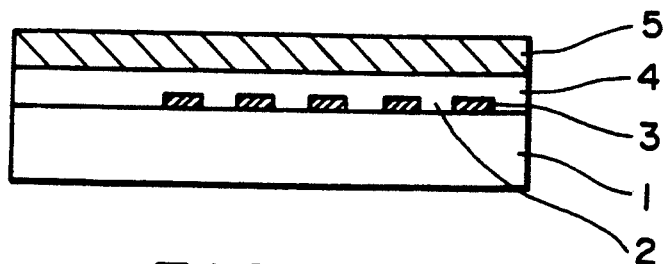
FIG. 1 is a schematic sectional view showing an example of the information recording medium of the present invention.

FIG. 1 is a schematic sectional view showing an example of the optical card in the information recording medium of the present invention. In FIG. 1, the optical card according to the present invention has a recording layer 3 comprising a photosensitive resin layer containing a dye subjected to patterning on a transparent substrate, with a track groove portion 2 being formed on the portion where no patterning is effected, and a card substrate 5 plastered through an adhesive layer on the recording layer.

The width of the track groove portion 2 may be about 2 to 4 $\mu$m, and the recording layer 3 is shaped in stripe with its line width being preferably about 3 to 10 $\mu$m.

Next, FIG. 2 (a) to (c) are schematic diagrams of the steps showing the method for forming the recording layer patterned in stripe of the optical card of the present invention.

First, in the step shown in FIG. 2 (a), a thin film 9 having a dye dispersed therein is formed on the transparent substrate 1. Next, in the step shown in FIG. 2 (b), on the thin film 9 having the dye dispersed therein obtained in the above FIG. 2 (a), a light 11 with the wavelength to which the thin film 9 of said photosensitive resin is sensitive irradiated through a light shielding mask 10 to effect exposure. Then, in the step shown in FIG. 2 (c), the thin film 9 of the photosensitive resin exposed in the above FIG. 2 (b) is developed, whereby the part irradiated with the light 11 remains as the recording layer 3, and the part not irradiated with the light 11 is removed as the track groove portion 2.

In the present invention, pattern formation in stripe of the recording layer may be effected by exposure with an aligner by use of a light shielding mask having a stripe pattern formed thereon, or alternatively exposure by use of interference with laser beam is also possible. After completion of exposure, a stripe pattern can be formed by development.

After stripe pattern formation, there is substantially no photosensitive resin containing the dye dispersed therein at the track groove portion 2, or it is very thin, if any, and therefore the track groove 2 and the recording layer 3 can be made to have reflectances of, for example, about 5% and 15%, respectively with the incident light from the transparent substrate 1 side. Therefore, the reflectance of the track groove portion 2 is sufficiently low to enable tracking signal. Also, since the reflectance of the recording layer 3 is as much as 3 times of that of the track groove portion, it is also possible to have autofocusing effected.

Further, by use of the mutual interaction between the phase difference and the difference in reflectance (amplitude difference), tracking signal can be also detected.

In the present invention, as the transparent substrate 1, one with little inconvenience in optical recording and reproduction is preferred, and it may be one having high transmittance to the light to be used, including acrylic resin, polyester resin, polycarbonate resin, vinyl resin, polysulfone resin, polyimide type resin, polyacetal resin, polyolefin resin, polyamide resin, cellulose derivative, etc.

The thin film 9 having the dye dispersed therein as the recording layer 3, when the wavelength of the light to be used, for example, the wavelength of the energy beam of reproducing light is 650 nm to 900 nm, should preferably have a greater difference between the reflectance in the pit, etc., which is the recorded portion and that at the unrecorded portion. Also, for recording, it is required that there should be absorption in the above wavelength region. Further, the required energy should be preferably lower. It is also preferred that the reflectances at the recorded portion (pit, etc.) and at the unrecorded portion should be changed with difficulty by the energy beam of the reproducing light.

Also, it is preferred that no fading should occur when mixed with the photosensitive resin and also no chemical change should occur in the developing step.

The thin film of the photosensitive resin having a dye capable of undergoing optical change in physical properties with energy beam should be one which can be formed into a continuous film and produced in large scale. Examples of such dye may include anthraquinone derivatives (particularly those having indanthrene skelton), dioxazine compounds and derivatives thereof, triphenodithiazine compounds, phenanthrene derivatives, cyanine compounds, melocyanine compounds, pyrylium type compounds, xanthene type compounds, triphenylmethane type compounds, croconium type dyes, azo dyes, crocones, azines, indigoids, methine type dyes, azulenes, squarilium derivaties, sulfide dyes and dithiolate complexes of metals, etc.

As the photosensitive resins having such dyes dispersed therein, UV-ray, far UV-ray, electron beam, X-ray sensitive resins may be employed, and posi-type resist or nega-type resist can be used.

Particularly, when a fine pattern for information recording medium is to be transferred, a nega-type resist may be particularly preferably employed.

Examples of such resist may include OMR83, (cyclized polyisoprene type) ONNR-20 poly(methyl isopropenyl ketone) type, 22 poly(methyl isopropenyl ketone) type, ODUR120 poly(glycidyl methacrylate), OEBR-1000 poly(methyl methacrylate) (all produced by Tokyo Oka Kogyo), CIR-700 cyclized polyisoprene type, JSRMES chlorinated polystyrene (all produced by Nippon Synthetic Rubber), RU-1000N poly(vinyl phenol) type, RU-1100N cyclized polyisoprene type, RD-2000N mixture of phenol styrene and bisazide compound; RE-4000N Novolac type (all produced by Hitachi Kasei Kogyo), SEL-N polystyrene type (Somal Kogyo), COP chloromethylstylene type (Mead), CMS-EX(S) Chloromethylstylene (Toyo Soda Kogyo), etc.

The photosensitive resin thin film having such dye dispersed therein may be formed according to the known coating methods. For example, there may be employed dip coating, spray coating, spinner coating, bar coating, blade coating, roll coating, curtain coating, etc. The thickness of said thin film may be approximately 500 to 2000 Å, preferably around 1000 Å. Particularly, in view of recording sensitivity, the thickness should be desirably thinner, while in view of S/N ratio during reproduction thicker, the optimum film thickness may differ depending on the kind of the photosensitive resin having the dye dispersed therein.

As the card substrate 5, all materials which can be used as the conventional card substrate can be used, and specific examples may include polyvinyl chloride, vinyl chloride-vinyl acetate copolymer, polyvinylidene chloride, acrylic polymers such as polymethyl methacrylate, etc., polystyrene, polypropylene, polycarbonate, epoxy, acrylonitrile-butadiene-styrene copolymer, etc. In some cases, metal sheets such as of iron, stainless sheet, aluminum, tin, copper, zinc, etc., synthetic paper, paper, etc. may be also available.

Further, laminated products of such materials as mentioned above are also available. These card substrates 5 may be also applied with pretreatment for improvement of adhesiveness such as corona discharging treatment, plasma treatment, primer treatment, etc.

The adhesive layer 4 may include, for example, the hot melt type ethylene-vinyl acetate copolymer and modified resin thereof, ethylene-ethyl acrylate copolymer, vinyl acetate-ethyl acrylate copolymer, polyimide type resin, etc. Since adhesives of thermosetting, photo-curable, combined light-heat curable type may sometimes invade the optical recording layer and cannot be directly plastered wholly, they can be plastered wholly after coating with partial adhesion or protective film. These adhesives may be known ones, which are not particularly limited.

In the information recording medium, if desired, magnetic recording layer, IC memory, engraved images, photographs, letters, mark, ink, relief letters called as ink print may be also provided in combination on the surface or the back of the card. Further, on the surface of the transparent substrate 1, hard coat may be sometimes applied for prevention of damage.

As described above, the information recording medium of the present invention has a recording layer comprising a photosensitive resin containing a dye subjected to patterning on a transparent substrate, and therefore has a recording layer on the portion subjected to patterning and a track groove portion on the portion not subjected to patterning, without forming the recording layer on the uneven shape of the track portion as in the prior art, to form it on a smooth transparent substrate, whereby uniformity of film thickness can be obtained to give stable recording sensitivity.

Further, by formation of the recording layer comprising a stripe pattern with a photosensitive resin having a dye dispersed therein, no stamper form for track groove is required, and the preformat pattern of the track groove can be formed together with the recording layer in the simple photolithographic steps of exposure and development, whereby cost down can be effected without requiring design and preparation of the stamper form.

Also, according to the present invention, a preformat pattern of high precision can be formed to give an optical recording medium of high C/N value.

In the present invention, as the preformat pattern, there may be included, for example, track groove, address pit, start pit, etc., specifically spiral concentric track grooves for optical disc with widths of 0.5 μm to 2 μm, pitches of 1.0 μm to 5 μm, parallel track grooves for optical card with widths of 2 μm to 5 μm, pitches of 8 μm to 15 μm, information pits with rectangular forms of 10 μm or less × 10 μm or less or circular forms of 10 μm in diameter.

In the following, the present invention is described in more detail by referring to Examples.

EXAMPLE 1

On a polymethyl methacrylate (hereinafter abbreviated as PMMA) substrate with a thickness of 0.4 mm, a dispersion of 10 part by weight of a polymethine type compound having the following formula:

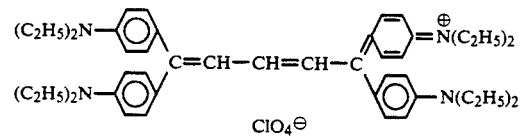

dispersed in 90 parts by weight of a nega-type photoresist OMR 83 (produced by Tokyo Oka) was coated by spinner coating, and then the coating was heated at 100° C. for 30 minutes to form a layer of 1000 Å. Then, by use of a mask aligner, exposure was effected with a chromium mask having a pattern of guide grooves with a groove width of 2.5 μm and a groove interval of 12 μm.

Then, development was carried out with a developer for exclusive use for the above nega-type photoresist UMR, followed by rinsing with a rinsing solution for exclusive use for OMR. Subsequently, as the card substrate, a PMMA plate with a thickness of 0.3 mm was used and adhered superposed on the above optical recording layer through a thermoplastic adhesive comprising an ethylene-vinyl acetate copolymer with a thickness of 0.05 mm to obtain an optical card.

On the optical card obtained was written an information by use of a semiconductor laser of an oscillation wavelength of 830 nm from the substrate side with a spot size of 1.5 μmφ, a recording power of 6 mW and a recording frequency of 2 MHz, reproduction was effected with a reading power of 0.8 mW, its reproduction waveform was subjected to spectrum analysis (scanning filter, band width 30 KHz), and the C/N ratio was measured to obtain the result of 0.45 to 0.50.

EXAMPLE 2

On a PMMA substrate with a thickness of 0.4 mm was coated a resin comprising 15 parts by weight of a polymethine type compound comprising the following formula:

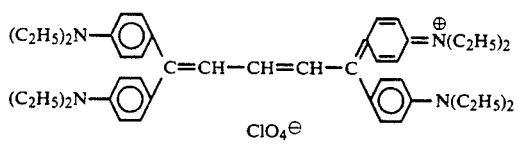

dispersed in 85 parts by weight of a nega-type photoresist HR-100 cyclized polyisoprene type (produced by Hunt) according to roll coating, followed by heating at 120° C. for 30 minutes to form a layer of 1500 Å. Then, by use of a mask aligner, exposure was effected with the use of a chromium mask having a pattern of guide groove with a groove width of 2.5 μm and a groove distance of 12 μm.

Subsequently, development was effected with the above developer for exclusive use for the nega-type photoresist, followed by rinsing with the rinsing solution for exclusive use for HR. Then, the card substrate was adhered similarly as in Example 1 to obtain an optical card. As the result of evaluation of the optical card obtained in the same manner as in Example 1, C/N ratio was found to be 0.5 to 0.6.

I claim:

1. A method for preparing an optical recording medium having a patterned recording layer, which comprises the steps of:
   (1) forming on a substrate a photosensitive resin layer comprising
      (a) a dye and
      (b) at least one photosensitive resin selected from the group consisting of positive type or negative type UV-ray sensitive resin, positive type or negative type electron beam sensitive resin, and positive type or negative type x-ray sensitive resin,
   said dye having durability against said photosensitive resin and being capable of absorbing light within a wavelength range of from about 650 nm to about 900 nm;
   (2) subjecting said photosensitive resin layer to pattern-exposure by using radiation to which said photosensitive resin is sensitive; and
   (3) developing said pattern-exposed photosensitive resin layer to effect patterning,
   wherein said dye is stable during said developing step,
   thereby forming in a single cycle of said forming step (1), said subjecting step (2), and said developing step (3), a patterned recording layer capable of recording information by laser beam irradiation, said patterned recording layer comprising both a pre-format and a recording aspect.

2. A method for preparing an optical recording medium according to claim 1, including the step of selecting as said photosensitive resin a negative type photosensitive resin.

3. A method for preparing an optical recording medium according to claim 1, including the step of selecting as said dye a dye which is not chemically changed during the patterning step, and which causes the recording layer to record information by an optically detectable change.

4. A method for preparing an optical recording medium according to claim 1, wherein the pattern exposure comprises comprehensive irradiation.

5. A method for preparing an optical recording medium according to claim 3, including the step of selecting as said dye a polymethine type dye.

6. A method for preparing an optical recording medium according to claim 4, including the step of forming a pattern in the recording layer using a light shielding mask with an aligner.

7. A method for preparing an optical recording medium according to claim 5, including the step of selecting as said dye a polymethine type dye having the formula:

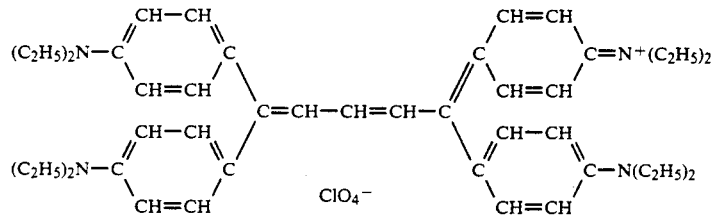

*   *   *   *   *

UNITED STATES PATENT AND TRADEMARK OFFICE
CERTIFICATE OF CORRECTION

PATENT NO. : 5,264,327
DATED : November 23, 1993           Page 1 of 2
INVENTOR(S) : MASARU KAMIO It is certified that error appears in the above-indentified patent and that said Letters Patent is hereby corrected as shown below:

COLUMN 1
    Line 27, "so" should read --so---.
    Line 32, "so called" should read --so-called--.
    Line 56, "irradaition" should read --irradiation--.

COLUMN 2
    Line 27, "also" should be deleted.
    Line 57, "FIG. 2(a) to (c)" should read --FIGS. 2(a) to 2(c)--.

Figure 2A:
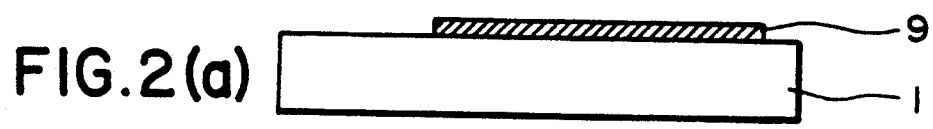
FIG. 2 (a) to (c) are schematic diagrams of the steps showing the method for forming the recording layer patterned in stripes in the present invention.
Figure 2B:
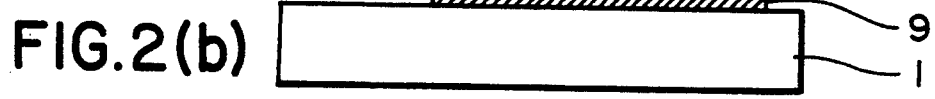
Figure 2C:
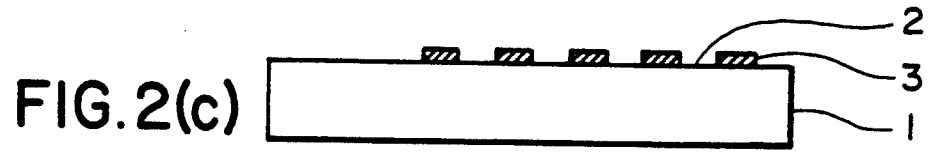
Figure 3:
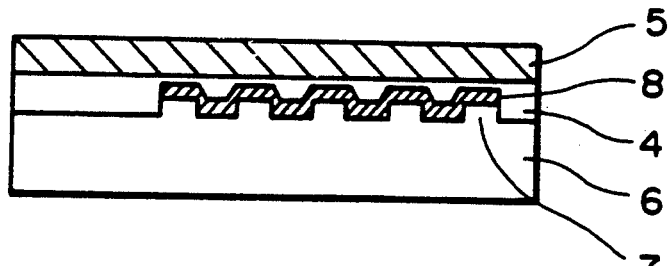
FIG. 3 is a schematic sectional view of an information recording medium of the prior art.

COLUMN 3
    Line 40, "FIG. 2(a) to (c)" should read --FIGS. 2(a) to 2(c)--.

COLUMN 4
    Line 6, "portion," should read --portion 2,--.
    Line 40, "skel-" should read --skele---.
    Line 43, "melocyanine" should read --merocyanine--.
    Line 57, "OMR83," should read --OMR83--.
    Line 58, "type)" should read --type),--.
    Line 67, "Novolac" should read --novolac--.

COLUMN 5
    Line 1, "chloromethylstylene" should read --chloromethylstyrene--.
    Line 2, "Chloromethylstylene" should read --chloromethylstyrene--.

UNITED STATES PATENT AND TRADEMARK OFFICE
CERTIFICATE OF CORRECTION

PATENT NO. : 5,264,327
DATED : November 23, 1993
INVENTOR(S) : MASARU KAMIO

It is certified that error appears in the above-indentified patent and that said Letters Patent is hereby corrected as shown below:

<u>COLUMN 7</u>
Line 28, "x-ray" should read --X-ray--.

<u>COLUMN 8</u>
Line 32, "light shielding" should read --light-shielding--.

Signed and Sealed this

Twentieth Day of September, 1994

Attest:

BRUCE LEHMAN

*Attesting Officer*     *Commissioner of Patents and Trademarks*